United States Patent
Wakami et al.

[11] Patent Number: 6,067,392
[45] Date of Patent: *May 23, 2000

[54] OPTICAL FIBER DIFFRACTION GRATING, A METHOD OF FABRICATING THEREOF AND A LASER LIGHT SOURCE

[75] Inventors: Toshinori Wakami; Masayuki Shigematsu; Yoshiaki Terasawa; Akira Inoue; Masakazu Shigehara; Toru Iwashima, all of Yokohama, Japan

[73] Assignee: Sumitomo Electric Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,697

[22] PCT Filed: Oct. 16, 1996

[86] PCT No.: PCT/JP96/03000

§ 371 Date: Jun. 16, 1997

§ 102(e) Date: Jun. 16, 1997

[87] PCT Pub. No.: WO97/14983

PCT Pub. Date: Apr. 24, 1997

[30] Foreign Application Priority Data

Oct. 16, 1995 [JP] Japan ................................ 7-267499

[51] Int. Cl.⁷ ........................................ G02B 6/22
[52] U.S. Cl. ........................ 385/37; 385/127; 385/128; 385/145; 385/147
[58] Field of Search ............... 385/37, 127, 128, 385/144, 145, 147; 359/900

[56] References Cited

U.S. PATENT DOCUMENTS

| | | | |
|---|---|---|---|
| 4,553,815 | 11/1985 | Martin | 350/96.23 |
| 4,799,762 | 1/1989 | Kakuta et al. | 350/96.34 |
| 4,923,278 | 5/1990 | Kashyap et al. | 350/96.3 |
| 5,042,898 | 8/1991 | Morey et al. | 385/37 |
| 5,694,503 | 12/1997 | Fleming et al. | 385/37 |
| 5,721,802 | 2/1998 | Francis et al. | 385/137 |

FOREIGN PATENT DOCUMENTS

| | | |
|---|---|---|
| 0 569 174 | 11/1993 | European Pat. Off. . |
| 0 611 097 | 8/1994 | European Pat. Off. . |
| 63-15488 | of 1988 | Japan . |
| 1-157438 | 6/1989 | Japan . |
| 7-92313 | 4/1995 | Japan . |
| 10-73740 | 3/1998 | Japan . |
| 10-96827 | 4/1998 | Japan . |
| 86/01303 | 2/1986 | WIPO . |
| 97/26572 | 7/1997 | WIPO . |
| 98/28480 | 8/1997 | WIPO . |

OTHER PUBLICATIONS

Yoffe et al, "Temperature–Compensated Optical–Fiber Bragg Gratings", OFC '95 Technical Digest, Wednesday Afternoon, pp. 134–135.

Kashyap, "Photosensitive Optical Fibers: Devices and Applications", Optical Fiber Technology 1, pp. 17–34 (1994).

Primary Examiner—Hung N. Ngo
Attorney, Agent, or Firm—Pillsbury Madison & Sutro LLP

[57] ABSTRACT

A diffraction grating portion (12) is formed in an optical fiber (10), having a diameter of 125 μm and serving to transmit light, along its optical axis. The optical fiber is concentrically surrounded by a lower coating portion (14) having an outer diameter of 300 μm and consisting of a silicone resin. The lower coating portion is concentrically surrounded by a coating portion (16) having an outer diameter of 900 μm and consisting of a liquid crystal polymer, e.g., polyester amide. The coating portion is further surrounded by an outermost coating portion (18) having an outer diameter of 1 mm and consisting of a UV curing resin colored for identification. Both the optical fiber (10) and the lower coating portion (14) have positive thermal expansion coefficients. In contrast to this, the coating portion (16) consisting of the liquid crystal polymer has a negative thermal expansion coefficient.

23 Claims, 8 Drawing Sheets

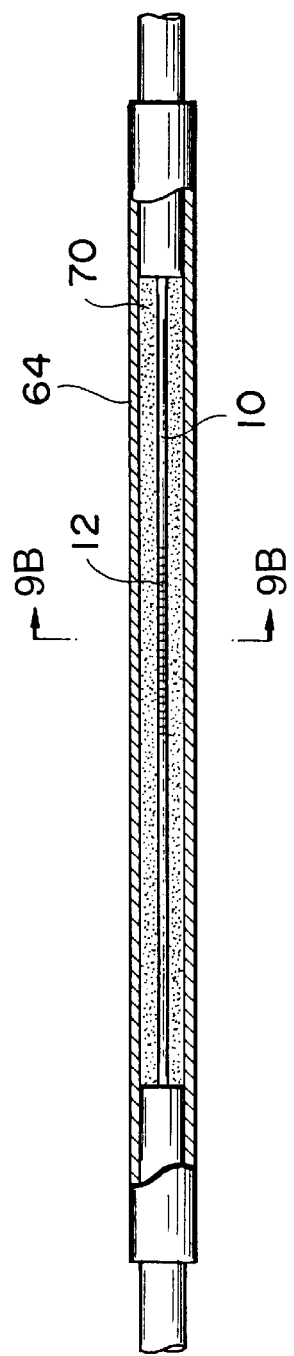
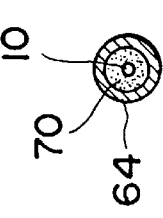

OPTICAL FIBER DIFFRACTION GRATING, A METHOD OF FABRICATING THEREOF AND A LASER LIGHT SOURCE

This application is the national phase of international application PCT/JP96/03000, filed Oct. 16, 1996 which designated the U.S.

TECHNICAL FIELD

The present invention relates to an optical fiber diffraction grating in which a diffraction grating portion for reflecting incident light having a specific wavelength is formed, a method of fabricating thereof, and an optical fiber diffraction grating laser using the optical fiber diffraction grating as an external resonance reflector.

BACKGROUND ART

An optical fiber diffraction grating can output light having a specific reflection wavelength upon reception of incident light. Owing to this advantage, a great deal of attention has recently been paid to the optical fiber diffraction grating as an important optical part in a division multiplex transmission wavelength division multiplex optical transmission communication system which multiplexes and transmits optical signals having different wavelengths through one optical fiber.

Such an optical fiber diffraction grating is generally constituted by a coating portion consisting of a plastic material and concentrically surrounding an optical fiber glass portion in which an optical fiber diffraction grating portion having a diffraction grating portion with a core the refractive index of which changes along the optical axis is formed. This coating portion is formed to protect the surface of the optical fiber glass portion, and is generally constituted by a primary coating portion consisting of a UV (ultraviolet) curing resin, a silicone resin, or the like and directly surrounding the optical fiber glass, and a secondary coating portion consisting of a polyethylene resin or the like and surrounding the lower coating portion. In addition, in order to improve the strength and hydrogen resistance characteristics, the primary coating directly surrounding the glass portion may have a two-layer structure using a carbon coating as the lower layer.

In the optical fiber diffraction grating having this structure, since the optical fiber has a positive linear thermal expansion coefficient within the operating temperature range, when the ambient temperature changes, the optical fiber expands/contracts, and stress is exerted on the optical fiber. The refractive index of the optical fiber glass portion therefore changes owing to the photoelastic effect. As a result, the reflection wavelength by the diffraction grating portion changes.

The reflection wavelength instability of this optical fiber diffraction grating with respect to changes in temperature cannot be neglected when the grating is to be used for a wavelength division multiplex optical communication system. In an optical fiber diffraction grating laser using such a conventional optical fiber diffraction grating as an external resonance reflector for the laser, the oscillation wavelength of the laser varies with changes in ambient temperature, posing a problem in terms of stability.

In order to solve such a problem, a method of fixing an optical fiber diffraction grating to an Invar rod or the like exhibiting small changes in temperature has been proposed (refer to G. W. Yoffe et al., "Temperature-compensated optical-fiber Bragg gratings", OFC '95, Technical Digest, W14, pp. 134–135).

More specifically, as shown in FIG. 6, Al brackets 52a and 52b having relatively large thermal expansion coefficients are mounted on the two ends of a 15-cm long Invar rod 50 having a small thermal expansion coefficient. An optical fiber diffraction grating 56 is fixed to the Al brackets 52a and 52b under a predetermined tension with latches 54a and 54b. In this case, a diffraction grating portion 58 of the optical fiber diffraction grating 56 is positioned between the two latches 54a and 54b.

When the ambient temperature rises, the optical fiber diffraction grating 56 fixed with the two latches 54a and 54b acts to expand. At the same time, however, the Al brackets 52a and 52b expand to decrease the distance between the two latches 54a and 54b. For this reason, the two forces in the opposite directions cancel out each other to reduce the stress exerted on the diffraction grating portion 58 of the optical fiber diffraction grating 56. Even if, therefore, the ambient temperature rises, an increase in the reflection wavelength based on the diffraction grating portion 58 can be prevented.

However, in the method of preventing variations in the reflection wavelength by the diffraction grating portion with respect to changes in temperature by fixing the optical fiber diffraction grating to, for example, an Invar rod exhibiting small changes in temperature, the device is mechanically complicated and hence difficult to handle. It is therefore required to realize a method of preventing variations in reflection wavelength with respect to changes in temperature with a simpler arrangement which is easy to handle.

The present invention has been made in consideration of the above situation, and has as its object to provide an optical fiber diffraction grating which ensures the reflection wavelength stability with respect to changes in temperature and improves the reliability with an easy-to-handle, simple arrangement.

It is another object of the present invention to provide an optical fiber diffraction grating manufacturing method which can easily manufacture such an optical fiber diffraction grating.

It is still another object of the present invention to provide an optical fiber diffraction grating laser using an optical fiber diffraction grating as a resonance reflector, which can vary ensure the oscillation wavelength stability with respect to changes in temperature.

DISCLOSURE OF INVENTION

An optical fiber diffraction grating according to claim 1 is characterized by comprising (a) an optical fiber having a diffraction grating portion in which a refractive index of a core changes along an optical axis, and a positive thermal expansion coefficient within an operating temperature range, and (b) a first coating portion concentrically surrounding the optical fiber having the diffraction grating portion, and consisting of a liquid crystal polymer having a negative thermal expansion coefficient within the operating temperature range. In this case, as the liquid crystal polymer for the first coating portion, polyester amide or the like is used.

In the optical fiber diffraction grating according to claim 1, the optical fiber having a positive thermal expansion coefficient is surrounded by the first coating portion consisting of the liquid crystal polymer, and the liquid crystal polymer has a negative thermal expansion coefficient. For this reason, the expansion/contraction of the first coating portion consisting of the liquid crystal polymer due to changes in ambient temperature cancels out the optical expansion/contraction of the optical fiber having a positive linear thermal expansion coefficient. For this reason, the expansion/contraction of the coating portion due to changes in temperature and the optical expansion/contraction of the optical fiber can be accurately canceled out by controlling the cross-sectional area of the optical fiber and the thickness of the first coating portion consisting of the liquid crystal polymer on the basis of the thermal expansion coefficients of the optical fiber and the first coating portion consisting of the liquid crystal polymer. Consequently, exertion of stress on the diffraction grating portion of the optical fiber diffraction grating can be prevented, and the refractive index of the optical fiber is free from changes due to the photoelastic effect. Variations in the reflection wavelength by the diffraction grating portion can be prevented. In this manner, the reflection wavelength stability of the optical fiber diffraction grating with respect to changes in temperature can be ensured, and the reliability of the device can be improved.

The above optical fiber diffraction grating preferably includes a second coating portion made of a plastic material or a carbon material, and formed between the optical fiber and the first coating portion consisting of a liquid crystal polymer to concentrically surround the optical fiber. In this case, as the plastic material for the coating portion, a UV curing resin, a silicone resin, or the like is used.

In this case, since the expansion/contraction of the first coating portion consisting of the liquid crystal polymer having a negative thermal expansion coefficient due to changes in temperature cancels out the expansion/contraction based on the net positive thermal expansion coefficient of the optical fiber and the second coating portion consisting of the plastic or carbon material and formed in tight contact with the optical fiber, exertion of stress on the diffraction grating of the optical fiber diffraction grating due to changes in temperature can be prevented, and variations in the reflection wavelength the diffraction grating portion can be prevented by controlling the cross-sectional area of the optical fiber, the thickness of the second coating portion consisting of the plastic or carbon material, and the thickness of the first coating portion consisting of the liquid crystal polymer.

A method of manufacturing an optical fiber diffraction grating according to claim 3 is characterized by comprising (a) the first step of drawing an optical fiber preform to form an optical fiber having a positive thermal expansion coefficient within an operating temperature range, (b) the second step of forming a diffraction grating portion by changing at least a refractive index of a core along an optical axis of the optical fiber, and (c) the third step of extruding a liquid crystal polymer material having a negative thermal expansion coefficient within the operating temperature range around the optical fiber having the diffraction grating portion, and forming a first coating portion made of the liquid crystal polymer and concentrically surrounding the optical fiber.

In the method of manufacturing an optical fiber diffraction grating according to claim 3, the same extruder as that used to form a polyethylene resin coating in the manufacture of a general optical fiber cable can be used to extrude and form a liquid crystal polymer around an optical fiber having a diffraction grating portion. Therefore, an optical fiber diffraction grating can be easily manufactured without any special difficulties as compared with the manufacture of a conventional optical fiber diffraction grating.

In the method of manufacturing an optical fiber diffraction grating according to claim 3, the second step may comprise the step of forming diffraction grating portions at a plurality of positions in the optical fiber, and the method may comprise the step of cutting the first coating portion made of the liquid crystal polymer and the optical fiber so as to divide the optical fiber into unit optical fibers each having one diffraction grating portion and the first coating portion formed around each unit optical fiber and consisting of the liquid crystal polymer after the third step.

In this case, a liquid crystal polymer is extruded and formed around an optical fiber having diffraction grating portions formed at a plurality of positions, and a first coating portion consisting of a liquid crystal polymer and concentrically surrounding the optical fiber is formed at once. Thereafter, the resultant structure is divided into optical fiber diffraction gratings. Therefore, optical fiber diffraction gratings can be consecutively manufactured in large quantities.

A method of manufacturing an optical fiber diffraction grating according to claim 5 is characterized by comprising (a) the first step of drawing an optical fiber preform to form an optical fiber having a positive thermal expansion coefficient within an operating temperature range, (b) the second step of forming a second coating portion around the optical fiber to concentrically surround the optical fiber, (c) the third step of forming a diffraction grating by changing at least a refractive index of a core along an optical axis in an exposed portion of the optical fiber after the second coating portion is partly peeled off, (d) the fourth step of forming the second coating portion again around the optical fiber having the diffraction grating portion, and (e) the fifth step of extruding a liquid crystal polymer having a negative thermal expansion coefficient within the operating temperature range around the second coating portion covering the optical fiber, and forming a first coating portion made of the liquid crystal polymer and concentrically surrounding the optical fiber.

In this case, similar to the method of manufacturing an optical fiber diffraction grating according to claim 3, an optical fiber diffraction grating can be easily manufactured without any special difficulties as compared with the manufacture of a conventional optical fiber diffraction grating.

In this method of manufacturing an optical fiber diffraction grating, the third and fourth steps may comprise the step of repeating a plurality of number of times the step of partly peeling off the second coating portion and forming the diffraction grating portion in the exposed portion of the optical fiber and the step of forming the second coating portion again around the optical fiber having the diffraction grating portion so as to form diffraction grating portions at a plurality of positions, and the step of forming the second coating portion again around the optical fiber having the diffraction gratings at the plurality of positions, and the method may comprise the step of cutting the first coating portion made of the liquid crystal polymer and the optical fiber so as to divide the optical fiber into unit optical fibers each having one diffraction grating portion and the first coating portion made of the liquid crystal polymer and formed around each unit optical fiber after the fifth step.

In this case, diffraction grating portions are formed at a plurality of positions in an optical fiber by repeating a plurality of number of times the step of partly peeling off a second coating portion and forming a diffraction grating portion in the exposed portion of an optical fiber, and a first coating portion consisting of a liquid crystal polymer is formed around the optical fiber having the diffraction grating portions at the plurality of positions at once. Thereafter, the resultant structure is divided into optical fiber diffraction gratings. Therefore, optical fiber diffraction gratings can be consecutively manufactured in large quantities.

An optical fiber diffraction grating laser according to the present invention is characterized by comprising (a) a laser medium and (b) the optical fiber diffraction grating defined by claim 1 which is used as an external resonance reflector for the laser medium.

In this case, the laser medium may comprise a laser diode, or (a) a pumping light source for emitting pumping light, and (b) an optical fiber which is doped with a rare earth element and receives pumping light.

In the laser source according to claim 7, the optical fiber diffraction grating defined by claim 1, i.e., the optical fiber diffraction grating which is formed by concentrically surrounding an optical fiber having a diffraction grating portion with a first coating portion consisting of a liquid crystal polymer having a thermal expansion coefficient with a sign opposite to that of the thermal expansion coefficient of the optical fiber so as to cancel out the optical expansion/contraction of the optical fiber glass portion due to changes in temperature, is used as an external resonance reflector for the laser medium. With this structure, since the reflection wavelength stability of the optical fiber diffraction grating with respect to changes in temperature can be ensured, the oscillation wavelength stability of the laser source with respect to changes in temperature can be ensured.

BRIEF DESCRIPTION OF DRAWINGS

FIGS. 9A and 9B are views showing the structure of an optical fiber diffraction grating according to still another embodiment of the present invention.

BEST MODE OF CARRYING OUT THE INVENTION

Figure 1A:
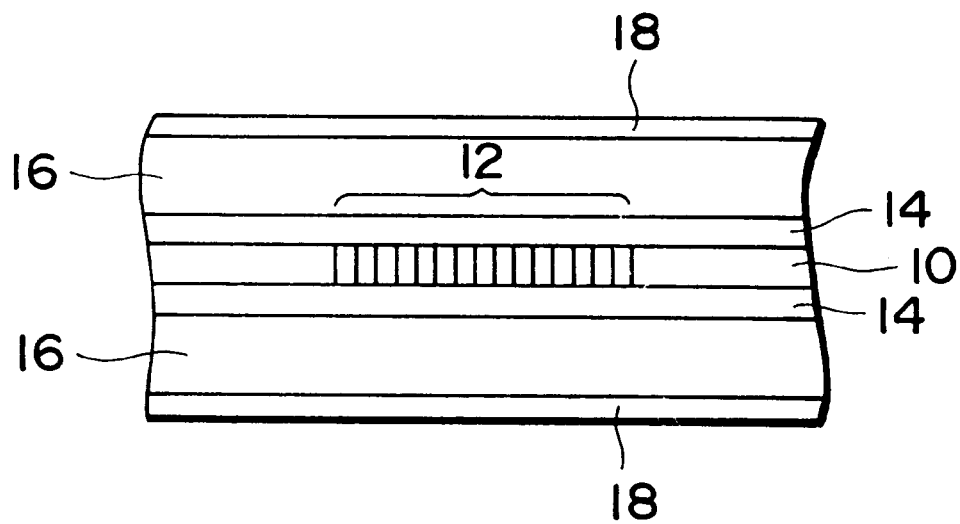
FIGS. 1A and 1B are views showing the structure of an optical fiber diffraction grating according to an embodiment of the present invention.

Embodiments of the present invention will be described below with reference to the accompanying drawings. The same reference numerals denote the same parts throughout the drawings, and a repetitive description will be avoided.

Figure 1B:
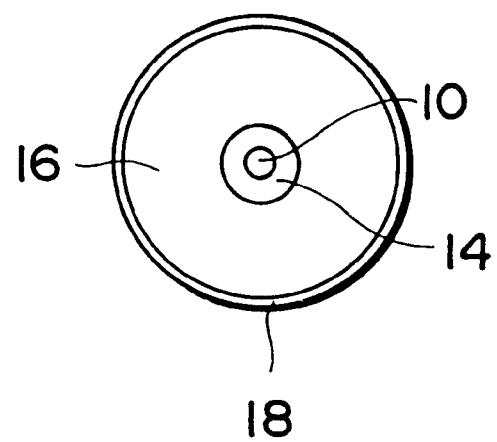

FIGS. 1A and 1B show the structure of an optical fiber diffraction grating according to an embodiment of the present invention. FIG. 1A is a perspective plan view of the optical fiber diffraction grating according to the embodiment. FIG. 1B is a longitudinal sectional view of the optical fiber diffraction grating in FIG. 1A.

As shown in FIGS. 1A and 1B, the optical fiber diffraction grating according to this embodiment has an optical fiber 10 having a diameter of 125 $\mu$m, through which light is transmitted. A diffraction grating portion 12 having a predetermined period and a predetermined length and serving to change the refractive index of the core of the optical fiber 10 along the optical axis is formed in the optical fiber 10. The optical fiber 10 having the diffraction grating portion 12 is concentrically surrounded by a lower coating portion 14 having an outer diameter of 300 $\mu$m and consisting of a plastic material, e.g., a silicone resin. The lower coating portion 14 consisting of the silicone resin is concentrically surrounded by a coating portion 16 having an outer diameter of 900 $\mu$m and consisting of a liquid crystal polymer, e.g., polyester amide. The polyester amide coating portion 16 is also surrounded by an outermost coating portion 18 having an outer diameter of 1 mm and consisting of a UV curing resin which is colored for identification.

As described above, the optical fiber diffraction grating according to the first embodiment comprises the optical fiber 10 having the diffraction grating portion 12, the lower coating portion 14 consisting of the silicone resin and concentrically covering the optical fiber 10, the polyester amide coating portion 16, and the outermost coating portion 18 consisting of the colored UV curing resin. Both the optical fiber 10 and the lower coating portion 14 consisting of the silicone resin have positive thermal expansion coefficients. In contrast to this, the polyester amide coating portion 16 has a negative thermal expansion coefficient, e.g., a thermal expansion coefficient of $-1.8 \times 10^{-5}/°$ C. to $-7.2 \times 10^{-6}/°$ C. For this reason, the expansion/contraction of the optical fiber 10 and the lower coating portion 14 consisting of the silicone resin due to changes in temperature is canceled out by the expansion/contraction of the polyester amide coating portion 16 in the opposite direction, thereby preventing stress from being exerted on the diffraction grating portion 12 of the optical fiber diffraction grating with changes in temperature. Therefore, the optical fiber 10 undergoes no change in refractive index due to the photoelastic effect, and variations in the reflection wavelength by the diffraction grating portion 12 can be suppressed.

As described above, when the diameter of the optical fiber 10 was set to 125 $\mu$m; the outer diameter of the lower coating portion 14 consisting of the silicone resin, 300 $\mu$m; and the outer diameter of the polyester amide coating portion 16, 900 $\mu$m, the variations in reflection wavelength with respect to changes in temperature could be suppressed to $1 \times 10^{-5}$ nm/° C. or less. In this manner, the reflection wavelength stability of the optical fiber diffraction grating with respect to changes in temperatures could be ensured, and the reliability of the device could be improved.

Figure 6:
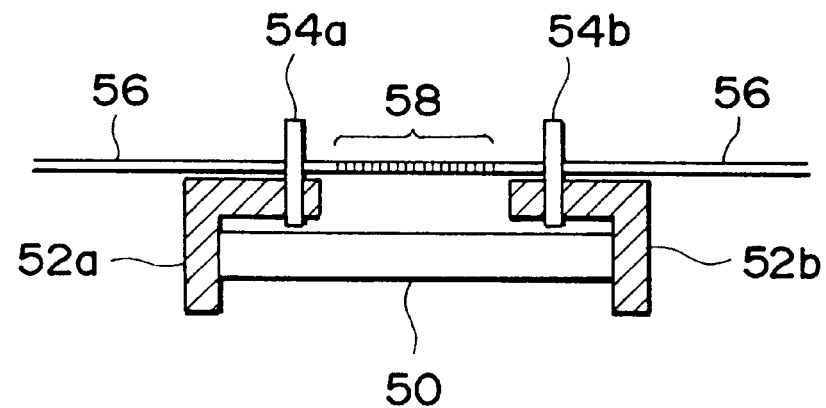
FIG. 6 is a view for explaining a method of preventing the reflection wavelength by a conventional optical fiber diffraction grating from varying with changes in temperature.

In addition, a compact optical fiber diffraction grating having a simple structure can be obtained by only using polyester amide for the coating portion 16 instead of the special device in FIG. 6. Furthermore, since polyester amide used for the coating portion 16 is harder than a conventional plastic material such as a silicone resin or a UV curing resin, the influences of external stress on the diffraction grating portion 12 can be prevented. For this reason, the optical fiber diffraction grating can be easily handled and easily incorporated in various devices.

In the optical fiber diffraction grating according to this embodiment, polyester amide is used as a thermotropic liquid crystalline polymer for the coating portion 16.

However, the present invention is not limited to this. For example, polyester, polyazomethine, polyester carbonate, and their compounds may be used (refer to Japanese Patent Laid-Open No. 4-5165).

As the plastic material for the lower coating portion 14, a silicone resin is used. However, the present invention is not limited to this. For example, a UV curing resin or the like may be used.

Figure 2:
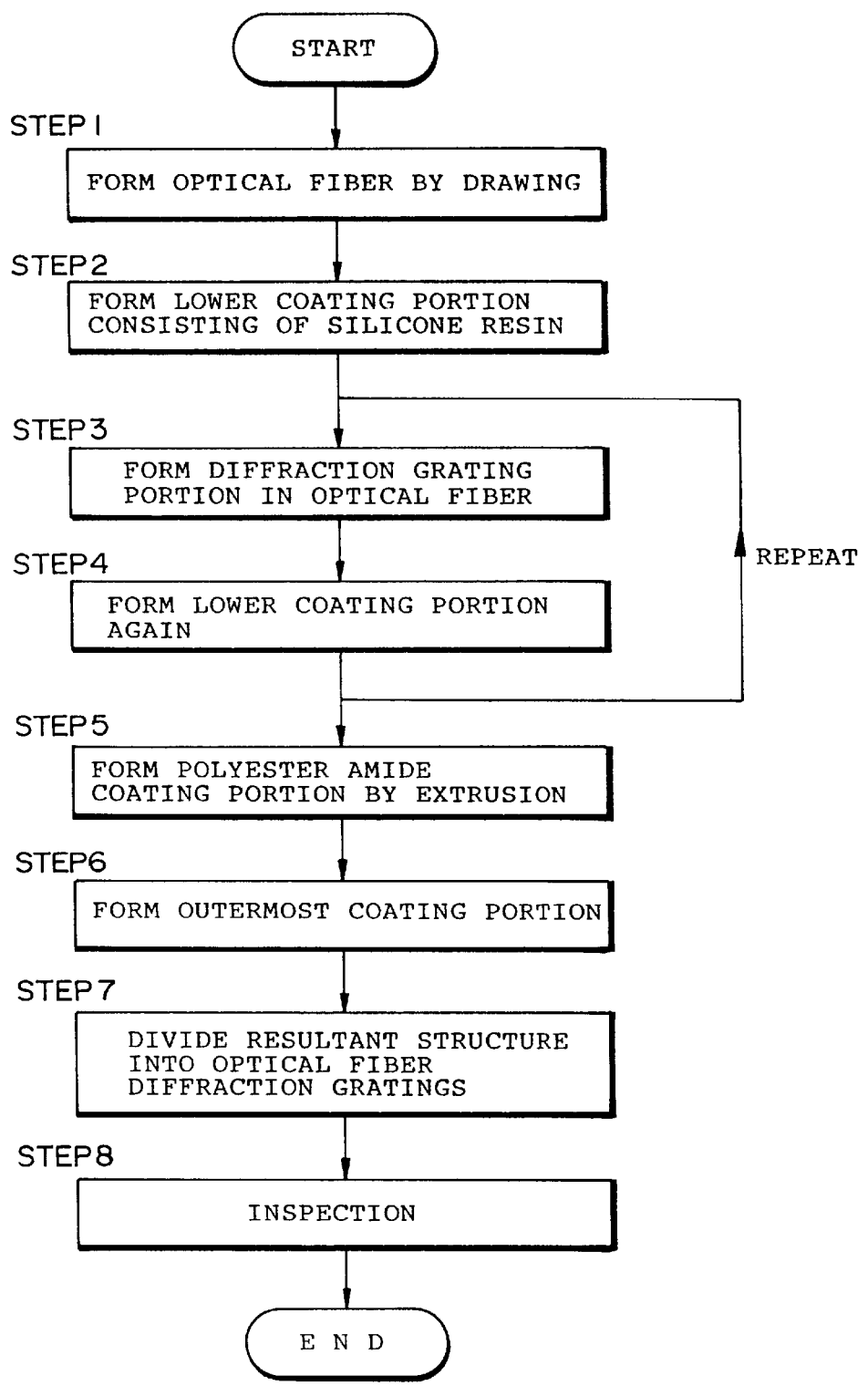
FIG. 2 is a flow chart for explaining a method of manufacturing the optical fiber diffraction grating in FIGS. 1A and 1B.

FIG. 2 is a flow chart for explaining a method of manufacturing the optical fiber diffraction grating in FIGS. 1A and 1B. The method of manufacturing the optical fiber diffraction grating in FIGS. 1A and 1B will be described below with reference to FIG. 2.

First of all, an optical fiber preform is heated to melt and drawn into an optical fiber 10. In this case, the outer diameter of the optical fiber 10 is measured by an optical measuring device in a noncontact manner, and the feed speed of the optical fiber preform and the take-up speed of the optical fiber are adjusted such that the diameter of the optical fiber 10 is controlled to 125 µm (step 1).

A lower coating portion 14 consisting of a silicone resin is concentrically formed around the optical fiber 10 which has passed through the outer diameter measuring device. At this time, the outer diameter of the lower coating portion 14 surrounding the optical fiber 10 is controlled to 300 µm (step 2).

After the lower coating portion 14 is partly peeled off from the optical fiber 10, a diffraction grating portion 12 in which the refractive index of the core of the optical fiber 10 changes along the optical axis is formed in the exposed portion of the optical fiber 10 (step 3).

Note that the diffraction grating portion 12 is formed by, for example, the phase mask method (refer to R. Kashyap, "Photosensitive Optical Fibers: Device and Applications", Optical Fiber Technology 1, 17–34 (1994)) in which ultraviolet rays irradiated through a phase mask are reflected within a rectangular prism and brought to interference on the surface of the optical fiber 10.

After the diffraction grating portion 12 having a predetermined period and a predetermined length is formed at a predetermined position in the optical fiber 10, a lower coating portion 14 consisting of a silicone resin is formed again around the resultant structure (step 4).

Subsequently, step 3 of forming a diffraction grating portion 12 in a portion of the optical fiber 10 which is exposed by partly peeling off the lower coating portion 14 and step 4 of forming a lower coating portion 14 around the diffraction grating portion 12 again are repeated a plurality of numbers of times. In this manner, diffraction grating portions 12 are formed at a plurality of positions in the optical fiber 10.

The same extruder as that used to form a polyethylene resin coating in the manufacture of a general optical fiber cable is used to extrude a polyester amide coating around the lower coating portion 14 covering the optical fiber 10 having the diffraction grating portions 12 formed at a plurality of positions, thus forming the coating portion 16. At this time, the outer diameter of the polyester amide coating portion 16 concentrically covering the optical fiber 10 and the lower coating portion 14 is controlled to 900 µm (step 5).

An outermost coating portion 18 consisting of a UV curing resin which is colored for identification is formed around the polyester amide coating portion 16. At this time, the outer diameter of the outermost coating portion 18 consisting of the UV curing resin and surrounding the coating portion 16 is controlled to 1 mm (step 6).

The outermost coating portion 18, the polyester amide coating portion 16, and the lower coating portion 14 consisting of the silicone resin, and the optical fiber 10 are cut at predetermined positions to be divided into optical fiber diffraction gratings, each constituted by a unit optical fiber having one diffraction grating portion 12, and the lower coating portion 14, the coating portion 16, and the outermost coating portion 18 which are formed around the fiber (step 7).

Finally, it is checked whether each optical fiber diffraction grating manufactured in this manner produces a desired reflection wavelength (step 8). The optical fiber diffraction gratings are then complete.

As described above, in the method of manufacturing the optical fiber diffraction grating according to the first embodiment, the same extruder as that used to form a polyethylene resin coating in the manufacture of a general optical fiber cable is used to extrude a polyester amide coating around the optical fiber 10 having the diffraction grating portion 12, thus forming the coating portion 16. For this reason, an optical fiber diffraction grating can be easily manufactured without any special difficulties, as compared with the manufacture of a conventional optical fiber diffraction grating.

In addition, the step of partly peeling off the lower coating portion 14 from the optical fiber 10 and forming the diffraction grating portion 12 in the exposed portion of the optical fiber 10 and the step of forming the lower coating portion 14 again around the diffraction grating portion 12 are repeatedly performed to form the diffraction grating portions 12 at a plurality of positions in the optical fiber 10. Thereafter, the polyester amide coating portion 16 is formed around the optical fiber 10 at once, and the resultant structure is divided into optical fiber diffraction gratings. Optical fiber diffraction gratings can therefore be manufactured consecutively in large quantities.

The same functions as those described above can be realized by the forms shown in FIGS. 7A, 7B, 8A, 8B, 9A, and 9B other than the optical fiber diffraction grating of the above embodiment.

According to the optical fiber diffraction grating ($\lambda B=1,550$ nm) shown in FIGS. 7A and 7B, optical fibers 10 having diffraction grating portions 12, each of which is identical to that used in the above embodiment, are mounted on a liquid crystaline polymer (to be referred to as LCP hereinafter) flat board 61 (Rodrun LC5000 available from UNITIKA, LTD.), and the optical fibers 10 are fixed to the LCP board with an epoxy adhesive (model number: 353ND available from Epotech Inc.). The flat board used in this case has a thickness of about 2 mm, and contains a liquid crystal aligned in one direction within the plane of the board. This board has a negative linear thermal expansion coefficient $\eta = -2$ to $-5 \times 10^{-6} K^{-1}$ at a temperature T of 20° C. or lower.

Figure 7A:
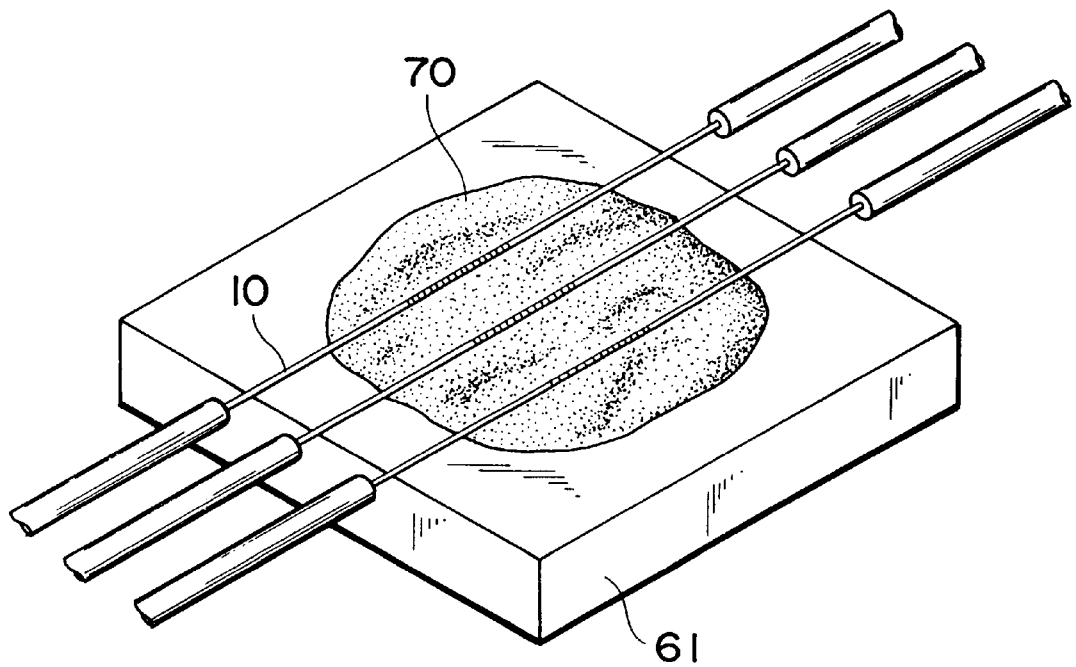
FIGS. 7A and 7B views showing the structure of an optical fiber diffraction grating according to another embodiment of the present invention.
Figure 7B:
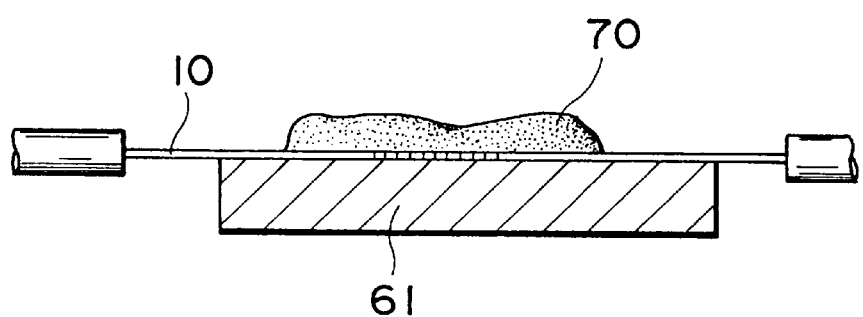
Figure 8A:
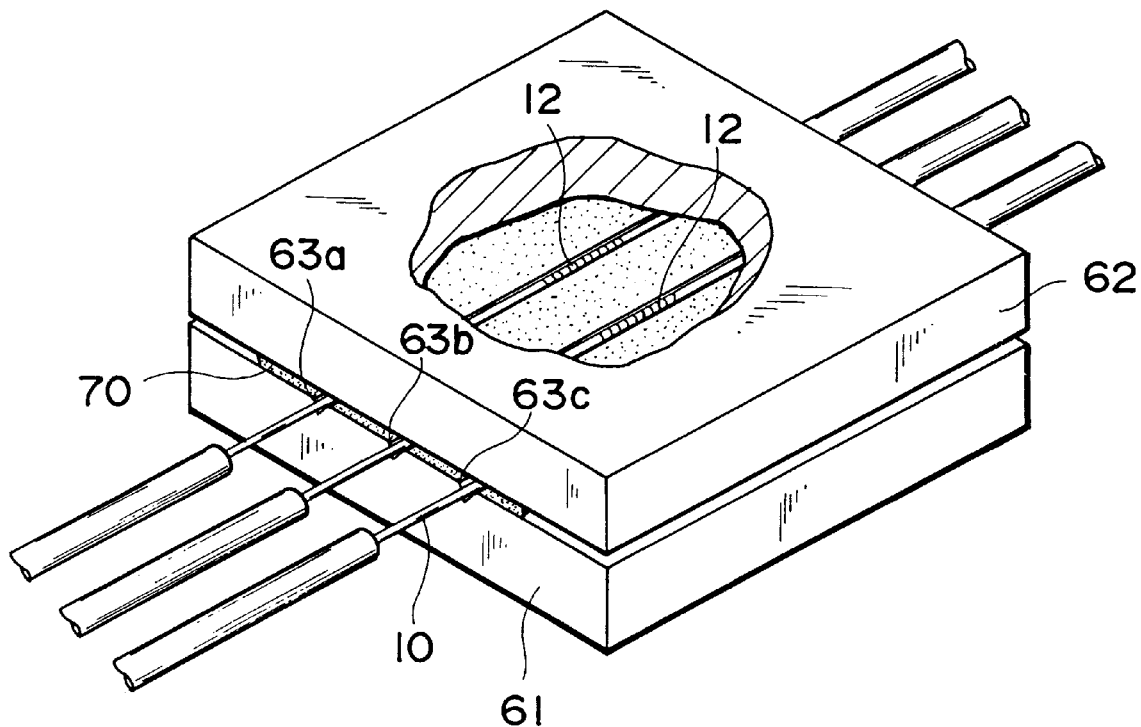
FIGS. 8A and 8B are views showing the structure of an optical fiber diffraction grating according to still another embodiment of the present invention.
Figure 8B:
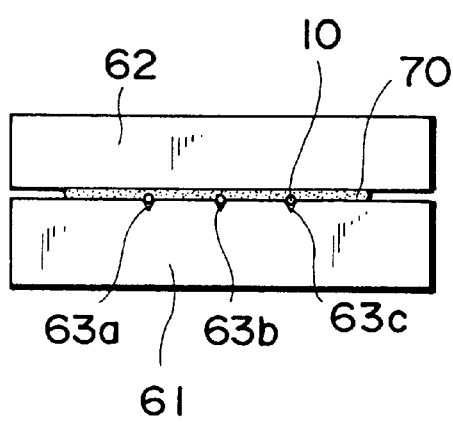

According to the embodiment shown in FIGS. 8A and 8B, V-shaped grooves 63a, 63b, and 63c are formed in an LCP flat board 61 identical to that shown in FIGS. 7A and 7B, and optical fibers 10 are arranged in the grooves. An upper LCP flat board 62 is then pressed against the optical fibers 10, and an epoxy adhesive 70 is injected between the V-shaped grooves 63a, 63b, and 63c and the flat boards 61 and 62, thereby fixing the optical fibers 10 to the LCP flat boards 61 and 62.

According to the embodiment shown in FIGS. 9A and 9B, a diffraction grating portion 12 is covered by a tube 64 (having an inner diameter of about 0.2 mm and an outer diameter of 0.9 mm and containing a liquid crystal almost aligned in the longitudinal direction) as an extruded LCP product. In addition, the tube is filled with an epoxy adhesive 70 identical to that shown in FIGS. 8A and 8B to fix an optical fiber 10 to the tube. In this case, this LCP pipe has a negative linear thermal expansion coefficient $\eta=-5$ to $-8\times10^{-6}K^{-1}$. The epoxy adhesive (353ND) used in this case has a linear thermal expansion coefficient $\eta=5.4\times10^{-5}K^{-1}$.

Figure 10A:
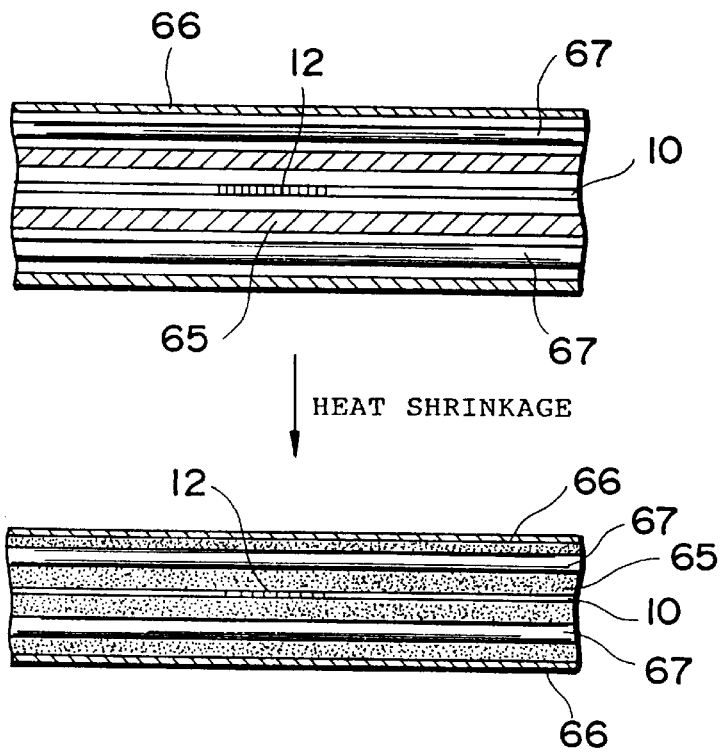
FIGS. 10A and 10B are views showing the structure of an optical fiber diffraction grating according to still another embodiment of the present invention.
Figure 10B:
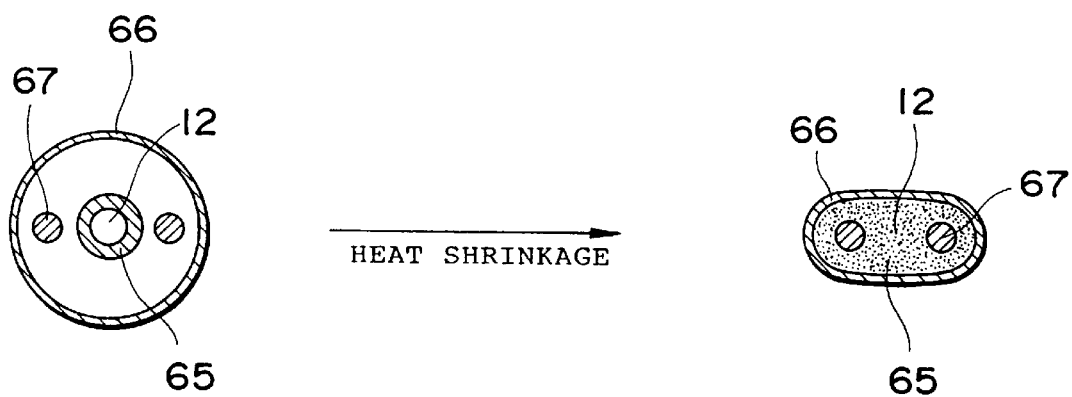

Still another embodiment is the optical fiber diffraction grating shown in FIGS. 10A and 10B. In this embodiment, as shown in FIGS. 10A, a fiber diffraction grating portion 12 is covered by a thermoplastic resin pipe 65. The thermoplastic resin pipe 65 is covered by a heat-shrinkable tube 66. One or a plurality of LCP (the same material as that used in the above embodiment) rods 67 (containing a liquid crystal aligned in almost the longitudinal direction) are inserted between the thermoplastic resin pipe 65 and the heat-shrinkable tube 66. In this state, this structure is heated to be integrated. In this heating process, the thermoplastic resin pipe 65 melts and the heat-shrinkable tube around the thermoplastic resin pipe 65 shrinks, as shown in FIG. 10B. As a result, the fiber diffraction grating portion 12 is reinforced by the thermoplastic resin, and bonded to the LCP rod 67. The resultant structure then has the same functions as those described above.

With this structure, the same stability and reliability as those of the optical fiber diffraction grating shown in FIGS. 1A and 1B can be ensured.

An optical fiber diffraction grating laser to which the optical fiber diffraction grating according to each embodiment of the present invention is applied will be described.

This laser source comprises a laser medium and the optical fiber diffraction grating according to at least one of the above embodiments which is used as an external resonance reflector for the laser medium.

In the laser source according to this embodiment, as an external resonance reflector for the laser medium, the optical fiber diffraction grating according to the above embodiment, i.e., the optical fiber diffraction grating obtained by concentrically surrounding the optical fiber 10 having the diffraction grating portion 12 with the polyester amide coating portion 16 to cancel out the optical expansion/contraction of the optical fiber 10, is used. With this structure, the reflection wavelength stability of the optical fiber diffraction grating with respect to changes in temperature can be ensured, and hence the oscillation wavelength stability of the laser with respect to changes in temperature can be ensured.

In order to improve the strength and hydrogen resistance characteristics, the coating portion may have a two-layer structure, with a carbon coating being used as the lower layer.

Examples of how the optical fiber diffraction grating according to each embodiment is applied to laser sources will be described below with reference to the accompanying drawings.

First Application Example

Figure 3:
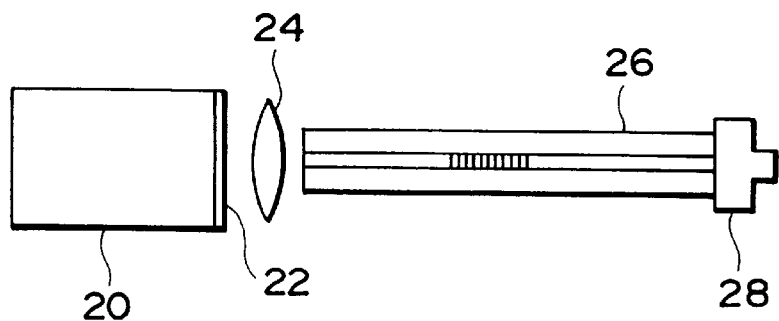
FIG. 3 is a view showing the structure of a laser source according to the first application example.

FIG. 3 shows the structure of a laser source according to the first application example. As shown in FIG. 3, in the laser source according to this application example, the exit end face of a laser diode 20 for emitting light is coated with an antireflection film 22 having a reflectance of about 5%. The exit end face of the laser diode 20 is optically coupled to one end portion of an optical fiber diffraction grating 26 according to the first application example through a coupling lens 24.

An optical connector 28 for connection to an optical fiber cable is attached to the other end portion of the optical fiber diffraction grating 26 for outputting a laser beam.

Figure 4:
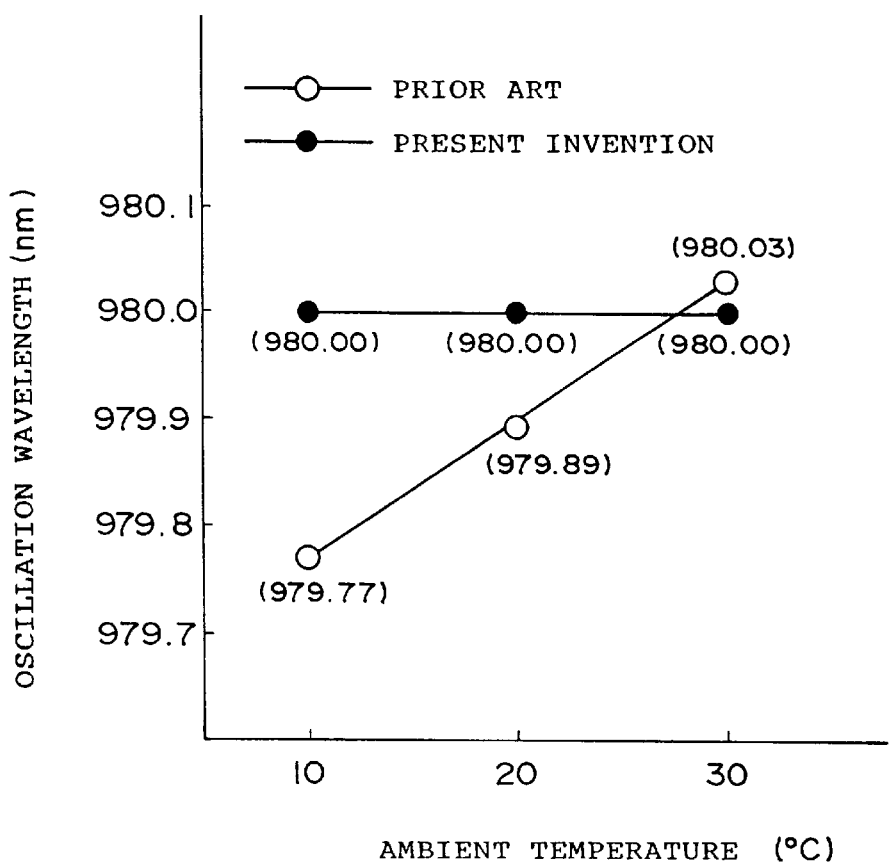
FIG. 4 is a graph showing the temperature dependence of the oscillation wavelength of the laser source in FIG. 3.

FIG. 4 is a graph showing the temperature dependence of the oscillation wavelength of the laser source in FIG. 3. The laser source according to this example uses the laser diode 20 as a laser medium, and the optical fiber diffraction grating 26 according to the above embodiment as an external resonance reflector. Variations in the reflection wavelength based on the optical fiber diffraction grating 26 with respect to changes in temperature are as small as $1\times10^{-5}$ nm/° C. or less. For this reason, as indicated by the graph of FIG. 4, the oscillation wavelength was always 980.00 nm within the ambient temperature range of 10° C. to 30° C. For the sake of comparison, FIG. 4 shows the characteristics obtained when an optical fiber diffraction grating coated with a general UV curing resin is used as an external resonance reflector. In this case, the oscillation wavelength varied between 979.77 nm, 979.89 nm, and 980.03 nm as the ambient temperature changed between 10° C., 20° C., and 30° C. By using the optical fiber diffraction grating 26 as the external resonance reflector in this manner, the oscillation wavelength stability of the optical fiber diffraction grating with respect to changes in temperature could be ensured, and the reliability of the device could be improved, as compared with the case wherein the optical fiber diffraction grating coated with the general UV curing resin was used.

In the laser source according to this application example, the laser diode 20 and the optical fiber diffraction grating 26 are optically coupled to each other through the coupling lens 24. However, a fiber lens obtained by processing the distal end of the optical fiber diffraction grating 26 so as to have a lens function may be used in place of the coupling lens 24.

Second Application Example

Figure 5:
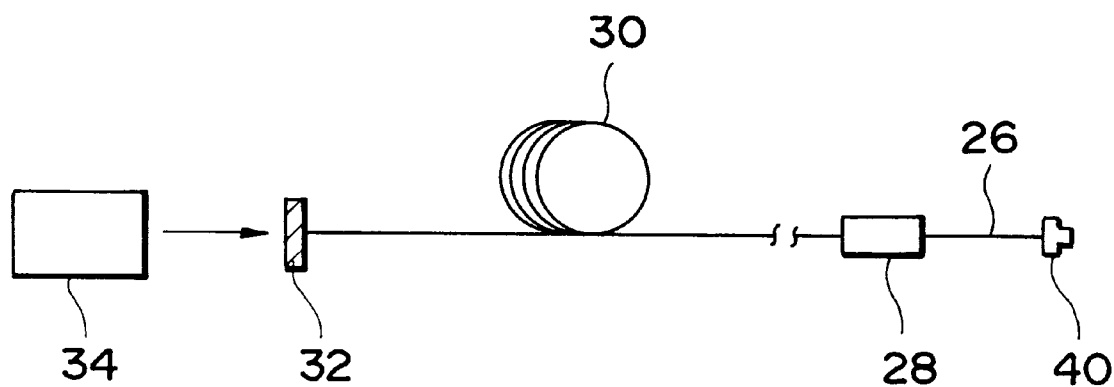
FIG. 5 is a view showing the structure of a laser source according to the second application.

FIG. 5 shows the structure of a laser source according to the second application example. As shown in FIG. 5, in the laser source according to this application example, one end of an optical fiber doped with a rare earth element, e.g., an EDF (Erbium Doped Fiber) 30 is coupled to an HR (Highly Reflective) mirror 32. This HR mirror 32 is optically coupled to a pumping light source 34 for emitting pumping light. The other end of the EDF 30 is optically coupled to the optical fiber diffraction grating 26 according to the above embodiment. This optical fiber diffraction grating 26 has a diffraction grating portion 28. An optical connector 40 for connection to the optical fiber cable is attached to the other end portion of the optical fiber diffraction grating 26 for outputting a laser beam.

As described above, according to the optical fiber diffraction grating laser of this application example, the optical fiber laser using the EDF 30 as a laser medium used the optical fiber diffraction grating 26 according to the above embodiment as an external resonance reflector. Since variations in the reflection wavelength based on the optical fiber diffraction grating 26 with respect to changes in temperature were very small, the oscillation wavelength stability of the optical fiber diffraction grating laser with respect to changes in temperature could be ensured, and the reliability of the device could be improved as in the first application example, as compared with a device using an optical fiber diffraction grating coated with a UV curing resin as an external resonance reflector.

Industrial Applicability

As has been described above, according to the present invention, an optical part playing an important role in division multiplex transmission wavelength division multiplex transmission, a method of manufacturing the same, and an application device using the same can be provided.

According to the optical fiber diffraction grating of the present invention, the optical fiber having a positive thermal expansion coefficient is surrounded by the coating portion consisting of the liquid crystal polymer, and this liquid crystal polymer material has a negative thermal expansion coefficient. For this reason, the optical expansion/contraction of the optical fiber due to changes in ambient temperature is canceled out by the expansion/contraction of the coating portion consisting of the liquid crystal polymer in the opposite direction, thus preventing variations in the reflection wavelength based on the diffraction grating portion. Therefore, the reflection wavelength stability of the optical fiber diffraction grating with respect to changes in temperature can be ensured, and the reliability of the device can be improved.

According to the method of manufacturing the optical fiber diffraction grating according to the present invention, since the coating portion is formed by extruding the liquid crystal polymer around the optical fiber having the diffraction grating portion, the optical fiber diffraction grating of the present invention can be easily manufactured.

In addition, after diffraction grating portions are formed at a plurality of positions in an optical fiber by repeating the step of forming a diffraction grating portion in the optical fiber, a coating portion consisting of a liquid crystal polymer is formed around the optical fiber glass portion at once. The resultant structure is then divided into optical fiber diffraction gratings. With this process, optical fiber diffraction gratings can be consecutively manufactured in large quantities.

Furthermore, since the laser source according to the present invention uses the optical fiber diffraction grating of the present invention as an external resonance reflector for a laser medium, the reflection wavelength stability of the optical fiber diffraction grating can be ensured. Therefore, the oscillation wavelength stability of the laser with respect to changes in temperature can be ensured.

We claim:

1. An optical fiber diffraction grating comprising:
    an optical fiber having a diffraction grating portion in which a refractive index of a core changes along an optical axis, and a positive thermal expansion coefficient within an operating temperature range; and
    a first coating portion concentrically surrounding said optical fiber having said diffraction grating portion, and consisting of a liquid crystal polymer having a negative thermal expansion coefficient within the operating temperature range.

2. A grating according to claim 1, further comprising a second coating portion made of a plastic material or a carbon material, and formed between said optical fiber and said first coating portion to concentrically surround said optical fiber.

3. A laser source comprising:
    a laser medium; and
    said optical fiber diffraction grating defined by claim 1 which serves as at least one external resonance reflector for said laser medium.

4. A laser source according to claim 3, wherein said laser medium comprises a laser diode.

5. A laser source according to claim 3, wherein said laser medium comprises a pumping light source for emitting pumping light and an optical fiber which is doped with a rare earth element and receives the pumping light.

6. A method of manufacturing an optical fiber diffraction grating, comprising:
    the first step of drawing an optical fiber preform to form an optical fiber having a positive thermal expansion coefficient within an operating temperature range;
    the second step of forming a diffraction grating portion by changing at least a refractive index of a core along an optical axis of said optical fiber; and
    the third step of extruding a liquid crystal polymer material having a negative thermal expansion coefficient within the operating temperature range around said optical fiber having said diffraction grating portion, and forming a first coating portion made of the liquid crystal polymer and concentrically surrounding said optical fiber.

7. A method according to claim 6, wherein the second step comprises the step of forming said diffraction grating portions at a plurality of positions in said optical fiber, and
    the method further comprises the fourth step of cutting said first coating portion made of the liquid crystal polymer and said optical fiber so as to divide said optical fiber into unit optical fibers each having one diffraction grating portion and said first coating portion formed around each unit optical fiber after the third step.

8. A method of manufacturing an optical fiber diffraction grating, comprising:
    the first step of drawing an optical fiber preform to form an optical fiber having a positive thermal expansion coefficient within an operating temperature range;
    the second step of forming a second coating portion around said optical fiber to concentrically surround said optical fiber;
    the third step of forming a diffraction grating by changing at least a refractive index of a core along an optical axis in an exposed portion of said optical fiber after said second coating portion is partly peeled off;
    the fourth step of forming said second coating portion again around said optical fiber having said diffraction grating portion; and
    the fifth step of extruding a liquid crystal polymer having a negative thermal expansion coefficient within the operating temperature range around said second coating portion covering said optical fiber, and forming a first coating portion made of the liquid crystal polymer and concentrically surrounding said optical fiber.

9. A method according to claim 8, wherein the third and fourth steps comprise the step of repeating a plurality of number of times the step of partly peeling off said second coating portion and forming said diffraction grating portion in the exposed portion of said optical fiber and the step of forming said second coating portion again around said optical fiber having said diffraction grating portion so as to form diffraction grating portions at a plurality of positions, and the step of forming said second coating portion again around said optical fiber having said diffraction gratings at the plurality of positions, and
    the method further comprises the step of cutting said first coating portion and said optical fiber so as to divide said optical fiber into unit optical fibers each having one diffraction grating portion and said first coating portion formed around each unit optical fiber after the fifth step.

10. A optical fiber diffraction grating comprising:
    an optical fiber having a diffraction grating portion in which a refractive index of a core changes along an optical axis, and a positive thermal expansion coefficient within an operating temperature range; and
    a first coating portion concentrically surrounding said optical fiber having said diffraction grating portion, said first coating portion having a negative thermal expansion coefficient within the operating temperature range.

11. A grating according to claim 10, further comprising a second coating portion made of a plastic material or carbon material, and formed between said optical fiber and said first coating portion to concentrically surround said optical fiber.

12. A laser source comprising:

a laser medium; and said optical fiber diffraction grating defined by claim 10, which serves as at least one external resonance reflector for said laser medium.

13. A laser source according to claim 12, wherein said laser source comprises a laser diode.

14. A laser source according to claim 12, wherein said laser medium comprises a pumping light source for emitting pumping light and an optical fiber which is doped with a rare earth element and received the pumping light.

15. An optical fiber grating comprising:

an optical fiber partially having a diffraction grating portion therein and comprising a material having a positive thermal expansion coefficient within an operating temperature range; and a member having a negative thermal expansion coefficient within said operating temperature range, said member being fixed with said diffraction grating portion of said optical fiber so as to exert the stress resulting from member to said optical fiber.

16. An optical fiber grating according to claim 15, wherein said member fixes at the portion comprising at least two portions of said optical fiber, and said diffraction grating portion being sandwiched by said at least two portions.

17. An optical fiber grating according to claim 15, wherein said member surrounds said diffraction grating formed on said optical fiber.

18. An optical fiber grating according to claim 15, wherein said member concentrically surrounds said diffraction grating formed on said optical fiber.

19. An optical fiber grating according to claim 15, wherein said member concentrically surrounds said diffraction grating formed on said optical fiber and is made of a liquid crystal polymer having a negative thermal expansion coefficient within the operating range.

20. An optical fiber grating according to claim 17, wherein said member is a shield for said optical fiber.

21. An optical fiber grating according to claim 15, wherein said member comprises a plate and said optical fiber is fixed to said plate by adhesive.

22. An optical fiber grating according to claim 15, further comprising a tubular-like member in which said diffraction grating portion is accommodated, wherein said optical fiber is fixed to said member at said at least two portions by said tubular-like member.

23. An optical fiber grating according to claim 15, wherein said member comprises a tube longitudinally extending in parallel with said optical fiber, and said diffraction grating portion is fixed to said tube by an adhesive.

* * * * *